Nov. 14, 1944.    W. L. KEEHN    2,362,637
WELDER'S HELMET
Filed Nov. 19, 1942
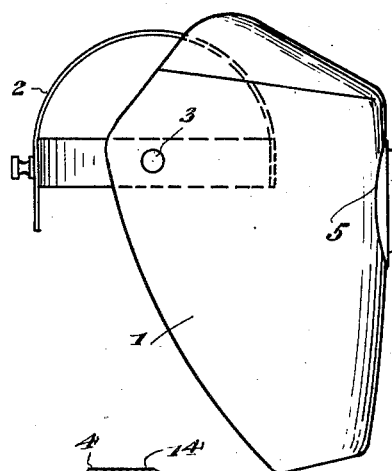
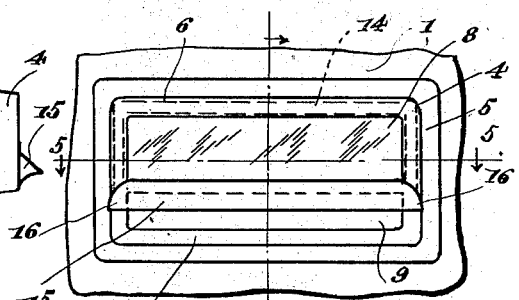
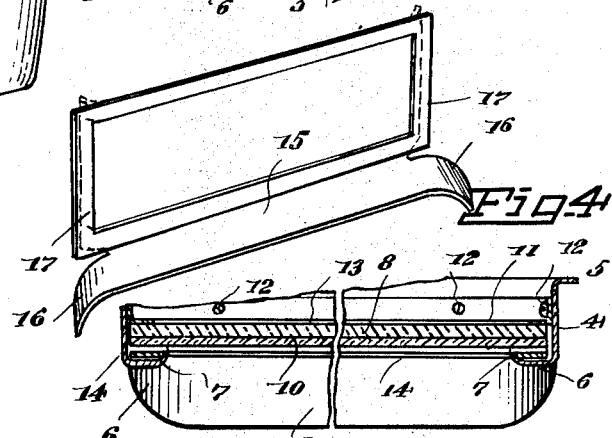
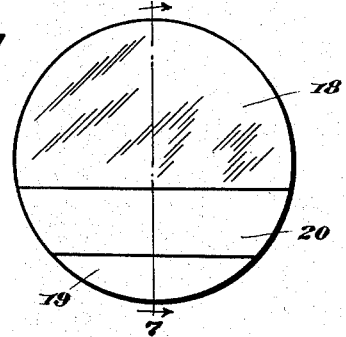
Inventor
Warner L. Keehn
By
Glenn L. Fisk
Attorney Patented Nov. 14, 1944

2,362,637

UNITED STATES PATENT OFFICE 2,362,637

WELDER'S HELMET

Warner L. Keehn, Spokane, Wash.

Application November 19, 1942, Serial No. 466,173

5 Claims. (Cl. 2—8)

This invention relates to a welder's helmet. At the present time, helmets worn by welders are equipped with a sighting glass consisting of a single sheet of black glass through which a welder can see only when a welding rod is in contact with metal parts to be welded and a brilliant light is created. This makes it difficult for the welder to properly apply the rod to parts to be welded and keep the metal parts in proper relation to each other prior to formation of a weld, as the parts must be set with the helmet lifted and the helmet then lowered and the rod applied by sense of touch, the metal parts and the rod being only visible when a flash occurs.

Therefore, one object of the invention is to provide a welder's helmet having its window provided with an upper sheet of black glass and a lower sheet of tinted glass through which the welder may see and thus properly set the metal pieces without swinging the helmet up over his head during setting of the metal pieces.

Another object of the invention is to so arrange the black glass and the tinted glass that, after setting the metal pieces it is merely necessary to tilt the head and thus bring the black glass into position for him to look through or while bringing the welding rod into contact with the metal pieces.

Another object of the invention is to provide a visor for shielding the tinted glass and preventing the eyes of the welder from being injured by glare passing through the tinted glass during a welding operation.

Another object of the invention is to provide the window of a welder's helmet with an outer sheet of clear glass serving as a protector for the black glass, which is very expensive, and preventing it from being damaged by flying particles of hot metal thrown off during a welding operation.

In the accompanying drawing:

Fig. 1 is a side elevation of a welder's helmet equipped with a sighting window of the improved construction.

Fig. 2 is a front elevation of the sighting window.

Fig. 3 is a vertical sectional view on the line 3—3 of Fig. 2.

Fig. 4 is a perspective view of a visor and mounting frame constituting part of the invention.

Fig. 5 is a horizontal sectional view on the line 5—5 of Fig. 2.

Fig. 6 is a front view of a modified embodiment of the invention for use in welder's goggles.

Fig. 7 is a sectional view taken vertically through Fig. 6, on the line 7—7.

This improved helmet has a body 1 formed of metal, composition or other suitable material which is opaque and will protect the face of a welder from burns or other injuries incident to welding. The head gear 2 is of conventional formation and the body 1 is pivotally connected with opposite sides of the head gear by pins 3 so that the helmet may be tilted vertically from lowered position in shielding relation to the welder's face, to raised position over his head, when not in use. At its front, the helmet 1 is formed with a sight opening surrounded by a window 4 which projects forwardly from the helmet and, at its rear, is formed with a bordering flange 5 by which it is firmly fixed to the helmet. At the front of the window, its walls are bent to form an inwardly projecting flange 6 terminating in an inturned lip 7, and, referring to Figs. 3 and 5, it will be seen that since the flange is yieldable, it may have firm gripping engagement with sighting glasses and the frame of a visor and hold them in place.

The sighting glasses 8 and 9 fit within the window 4, one above the other, the upper glass being black and the lower glass being either clear glass or tinted amber or any other color desired. These glasses have their contacting edge faces cemented together and are of such dimensions that they snugly fit into the window, as shown in Figs. 3 and 4. A sheet 10 of clear glass is disposed in front of the glasses 8 and 9 and serves to prevent them from being struck and damaged by particles of hot metal thrown off during a welding operation. The black glass 8 is expensive and it is important that it be protected from damage during a welding operation. After the glass 10 and the united glasses 8 and 9 have been fitted into the window 4, a frame 11 is fitted into place and secured by fasteners 12, which may be screws or bolts, and the flange 13 of this frame fits closely against inner surfaces of glasses 8 and 9 and the glasses will be firmly held in place with the lip 7 of flange 6 bearing against the outer surface of the glass 10.

After the glasses have been fitted into the window and secured by the frame 11, the frame 14, carrying a shield or visor 15, is applied. This frame and the visor are formed of resilient metal and the visor has free end portions 16 which are free from end portions 17 of the frame and bent to extend downwardly and rearwardly of the end portions of the flange 6. When applying the frame 14, its end portions 17 are flexed rearwardly, as indicated by dotted lines in Fig. 4, and disposed against the outer surface of the glass 10, so that they may slide into place under these end portions of the flange. The frame is then shifted upwardly to dispose its upper bar or strip under the upper portion of flange 6 and the inner side edges of the frame will then be overlapped by portions of the lip 7 and the frame firmly held in place with the visor disposed in front of the window with its end portions 16 bearing against outer surfaces of end portions of the flange 6. This visor overhangs the glass 9 in partial covering relation thereto, as shown in Fig. 3, and, when the helmet is in use, the welder may hold his head at such an angle that he can look through the glass 9 and under the visor, in order to see if the metal pieces to be welded are in proper relation with respect to each other and then accurately apply the welding rod thereto. As the rod is moved into engagement with the metal pieces to be welded, the welder quickly lowers his head so that the black glass is brought into his line of vision and his eyes will not be injured by the flash which occurs during the welding operation. The shield or visor 15 and its end portions 16 serve very effectively to prevent glare from reaching the glass 9 and passing through it into the helmet. It will thus be seen that a welder wearing the improved mask may set the metal pieces to be welded and apply the welding rod with the helmet in position for use in front of his face and the glasses 8 and 9 brought into his line of vision merely by tilting his head upwardly or downwardly. When necessary, the frame and the visor may be easily removed.

In Figs. 6 and 7 there has been illustrated a modification of the invention for use in welder's goggles. In this embodiment, a black upper glass 18 and a tinted lower glass 19 are used, these glasses being cemented to each other and cut circular so that the assembled glasses constitute a lens which will fit within the frame of a pair of goggles. The visor 20 is fixed to the glass 18 along the lower edge thereof and projects forwardly at a downward incline in overhanging relation to the upper portion of the glass 19.

Having thus described the invention, what is claimed is:

1. In a welder's helmet, a window projecting forwardly at the front thereof, an inwardly projecting flange about the front of said window having a lip projecting rearwardly into the window, a lens in said window consisting of an upper black glass and a lower transparent glass having its upper edge in face to face engagement with the lower edge of the upper glass, a transparent sheet in said window covering and protecting the outer surface of said lens, a retainer frame in said window engaging marginal portions of said upper and lower glasses and holding the glasses and the protecting sheet firmly against the lip of said flange, an open frame of resilient material fitted into said window against the outer surface of the upper glass with its end portions and its upper portion fitting back of and engaged by the flange and its lip to hold the frame in place, and a visor formed integral with said frame and projecting forwardly from the lower edge thereof at a downward incline, said visor having its end portions free from the frame and bent downwardly with their rear edges bearing against end portions of said flange.

2. In a welder's helmet, a window projecting forwardly at the front thereof, an inwardly projecting flange about the front end of said window, a lens in said window consisting of an upper black glass and a lower transparent glass, a protecting sheet of transparent material fitting within said window against the outer surface of said lens, a mounting frame fitting in said window against the outer surface of said protecting sheet with portions overlapped and gripped by end portions and the upper portion of said flange, and a visor projecting forwardly from the lower edge of said mounting frame at a downward incline with its end portions free from the mounting frame and bearing against end portions of said flange.

3. In a welder's helmet, a window projecting forwardly at the front thereof, an inwardly projecting flange about margins of the front end of said window, upper and lower glasses in said window overlapped by end portions and upper and lower portions of said flange, the upper glass being black, a mounting frame in said window having end portions and an upper portion overlapped and gripped by end portions and the upper portion of said flange, and a visor projecting forwardly from the lower portion of the mounting frame at a downward incline in overlying relation to the lower glass, said visor having its end portions bearing against end portions of said flange below the mounting frame.

4. In a welder's helmet, a window projecting forwardly at the front thereof, a lens in said window, an open mounting frame in said window in front of the upper portion of said lens, and a visor projecting forwardly from the lower edge of said mounting frame at a downward incline in overhanging and shielding relation to the lower portion of the lens, said visor having end portions free from the mounting frame and extending downwardly in contacting engagement with side portions of the window.

5. In a welder's helmet, a window projecting forwardly at the front thereof, an inwardly projecting flange about the front of said window, a lens in said window consisting of an upper black glass and a lower transparent glass, a transparent sheet in said window covering and protecting the outer surface of said lens, an open retainer in said window engaging marginal portions of said upper and lower glasses and holding the glasses and the protecting sheet firmly against said flange, an open frame of resilient material fitted into said window against the outer surface of the upper glass with its end portions and its upper portion fitting back of and engaged by the flange to hold the frame in place, and a visor projecting forwardly from the lower edge of said frame, at a downward incline, said visor having its end portions free from the frame and bent downwardly with their rear edges bearing against end portions of said flange.

WARNER L. KEEHN.